United States Patent [19]

Boomgaarden et al.

[11] Patent Number: 4,651,337
[45] Date of Patent: Mar. 17, 1987

[54] FILM POSITIONER

[75] Inventors: Jonathan C. Boomgaarden, Waukesha; Bruce Q. Bautista, West Bend; Charles R. Davis, Pewaukee, all of Wis.; Steven R. Frank, Evergreen, Colo.

[73] Assignee: General Electric Company, Milwaukee, Wis.

[21] Appl. No.: 792,276

[22] Filed: Oct. 28, 1985

[51] Int. Cl.⁴ ............................................. G03B 42/02
[52] U.S. Cl. ...................................... 378/177; 378/181
[58] Field of Search ............... 378/167, 175, 176, 177, 378/181, 172, 173, 174

[56] References Cited

U.S. PATENT DOCUMENTS

| | | | |
|---|---|---|---|
| 3,862,426 | 1/1975 | Thomas | 378/172 |
| 4,105,920 | 8/1978 | Pury et al. | 378/176 |
| 4,432,095 | 2/1984 | Adelmeyer et al. | 378/181 |

*Primary Examiner*—Janice A. Howell
*Attorney, Agent, or Firm*—Duckworth, Allen & Dyer

[57] ABSTRACT

A method and apparatus for controlling motion of power driven mechanisms in a medical x-ray spot filming system in order to minimize induced vibrations of x-ray film due to acceleration and deceleration of the power driven mechanisms. The invention includes a method and apparatus for establishing a desired profile of position of the x-ray associated mechanisms as a function of time and for implementing a move of the mechanism in accordance with the desired profile. In one form the profile is divided into a plurality of equal time increments and the motion of the mechanism is computed for each time increment as a function of a particular change in position such that a move can be completed within a fixed time interval. Depending upon the length of the move, a change in position for each time increment is determined and the mechanism is moved in accordance with the computed position change for each time increment.

9 Claims, 5 Drawing Figures

FILM POSITIONER

BACKGROUND OF THE INVENTION

The present invention relates to x-ray apparatus and, more particularly, to a method and apparatus for rapidly positioning an x-ray film with minimum vibration.

In x-ray apparatus, an x-ray sensitive film is positioned in a line with a target and an x-ray source whereby x-rays from the source are attenuated by the target before impinging on the film to thereby obtain an image of the target. One type of x-ray apparatus is a "spot film" system in which multiple images may be obtained on a single large sheet of x-ray film by blocking the x-rays from selected portions of the film sheet and moving the sheet as needed to various positions.

Such spot film devices commonly involve a table on which a target, e.g., a patient, is positioned and a motor driven mechanism within the table for moving the table to various desired locations. A film holding mechanism is positioned above the patient and also includes a motor for moving the film into selected positions. The actual target may be only a small area of the patient's anatomy. Present day devices include x-ray impervious plates which can be selectively positioned between the patient and film in order to obtain multiple images on a single film. However, if the target area is not changed, the film must be re-positioned in order to align an unexposed portion with the target.

Each time that a film holder or other apparatus mechanically connected to the film holder is moved, whether from an original loading position or merely for re-positioning, translational forces applied to the film holder during starting and stopping create mechanical vibrations within the x-ray apparatus. Such vibrations may be of the film holder or may involve other structural elements of the x-ray table. In either case, the vibrations can result in jitter of the x-ray film and a loss of definition (resolution) or image quality if an exposure is made before the vibrations have ceased. The problem of controlling vibrations is exacerbated since a main objective of the film handling device or holder is to deliver the film to a desired position as rapidly as possible in order to minimize the time required between exposures.

It is an object of the present invention to provide an improved method for positioning a film holder and associated apparatus.

It is another object of the present invention to provide an improved method for positioning a film holder which rapidly transfers film between positions while minimizing mechanical vibration.

SUMMARY OF THE INVENTION

The above and other objects are achieved in a control system for x-ray positioning which provides continuous control of the motion of a film holder so as to implement a predetermined acceleration/deceleration profile characteristic over the distance moved. In a preferred embodiment, the motion profile is implemented as an inverted cosine curve when plotted as a function of distance moved versus time. Each move, regardless of distance, is set to be completed in the same time duration. The variable for each move then becomes only the amplitude, i.e., the distance, of the move. Accordingly, for any move, the motion profile can be implemented using a unit value profile multiplied by the move distance. In order to achieve the constant smooth control, the unit value profile is divided into a predetermined number of equal time increments in which the change in position over each time increment becomes an error signal for driving a servo-amp controlling a motor positioning the film holder. A position feedback device connected to the film holder provides a signal indicative of actual position of the holder. The difference between the feedback signal and the error signal provides a drive signal to move the holder. Since the error signal is a function of small position increments, the force applied to move the holder is more gradual and constant and therefore avoids jerking of the holder. This motion control approach also allows control of time for moves without sudden load application.

SUMMARY OF THE DRAWINGS

The above and other objects, features and advantages of the present invention will become apparent from the following detailed description taken in conjunction with the accompanying drawing in which.

DETAILED DESCRIPTION

Figure 1:
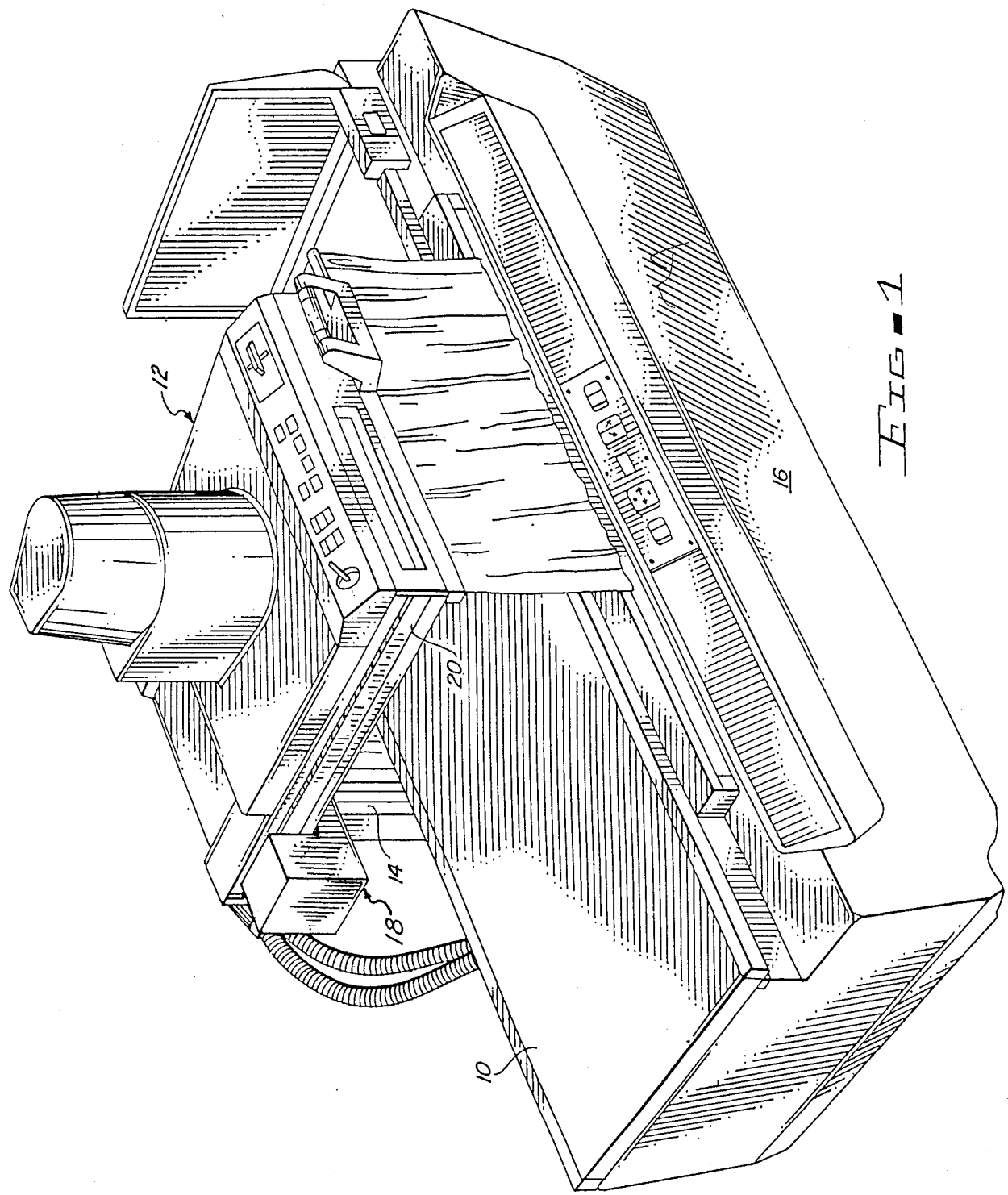
FIG. 1 is a perspective view of a spot-filming x-ray apparatus.

Referring now to FIG. 1, there is shown a simplified perspective view of an x-ray spot filming apparatus with which the present invention is particularly useful. The apparatus includes an x-ray table 10 and a spot filming apparatus 12. The spot filming apparatus 12 is supported above the table 10 on a column or support tower 14. The apparatus 12 can be moved vertically to raise or lower a film with respect to the upper surface of the table 10. The table 10 is supported by a pedestal 16. The table 10 may be moved by either rotation or longitudinally with respect to the spot film apparatus 12. The top of the table 10 constitutes a planar patient examining surface.

The spot filming apparatus 12 and the support tower 14 are also capable of movement transversely with respect to the table top 10 by means of a support carriage (not shown). A conventional x-ray tube or source (not shown) is located within the table support 16.

The spot filming apparatus 12 is attached to the tower 14 by a support frame that includes a pair of transversely extending support arms 18, only one of which is visible in the illustrative FIG. 1. The arms 18 move vertically on the tower 14 for positioning the spot filming apparatus 12 vertically with respect to a patient located on the table 10. The spot filming apparatus 12 also slides within the support arms 18 on side support rails 20. The spot filming apparatus 12 is manually moved between a rearward position and a forward position (the position shown in FIG. 1). In the rear position, the film is out of the direct line of the x-ray source within the support means 16 and is located in what is referred to as a non-operating poistion. In the forward or operating position, the spot filming apparatus 12 overhangs the patient examining surface on top of table 10. As will be appreciated, the normal operating mode of the system is to load a film cassette into a film holder in the spot filming apparatus 12 while the apparatus 12 is in the forward or operative position. When a command is given to expose an image using the x-ray source in the support apparatus 16, the film holder 26 is driven so as to position a film in the proper location for exposure. Additional apparatus within the spot filming apparatus 12 may also be used to block portions of the film when it is desired to make multiple images on a single large sheet of film.

Each time that a film is moved within the apparatus 12 and then stopped at a filming location, a mechanical vibration is induced which can result in jitter of the film and possible loss of definition of any image on the film if an image is made prior to cessation of the jitter. Accordingly, it has been the prior practice to inhibit film exposure for a predetermined time following a move. The predetermined time is chosen so as to assure that a majority of vibrations or jitter have ceased prior to an exposure being made. One of the difficulties incurred in such a system is that a patient is initially placed in a desired position and then must hold that position while an image is being taken. If the patient moves prior to the image being taken, the desired image may be missed requiring further exposures. Accordingly, it is desirable to minimize any delay between the time that a patient is placed in a desired position and the time an image is taken.

Figure 2:
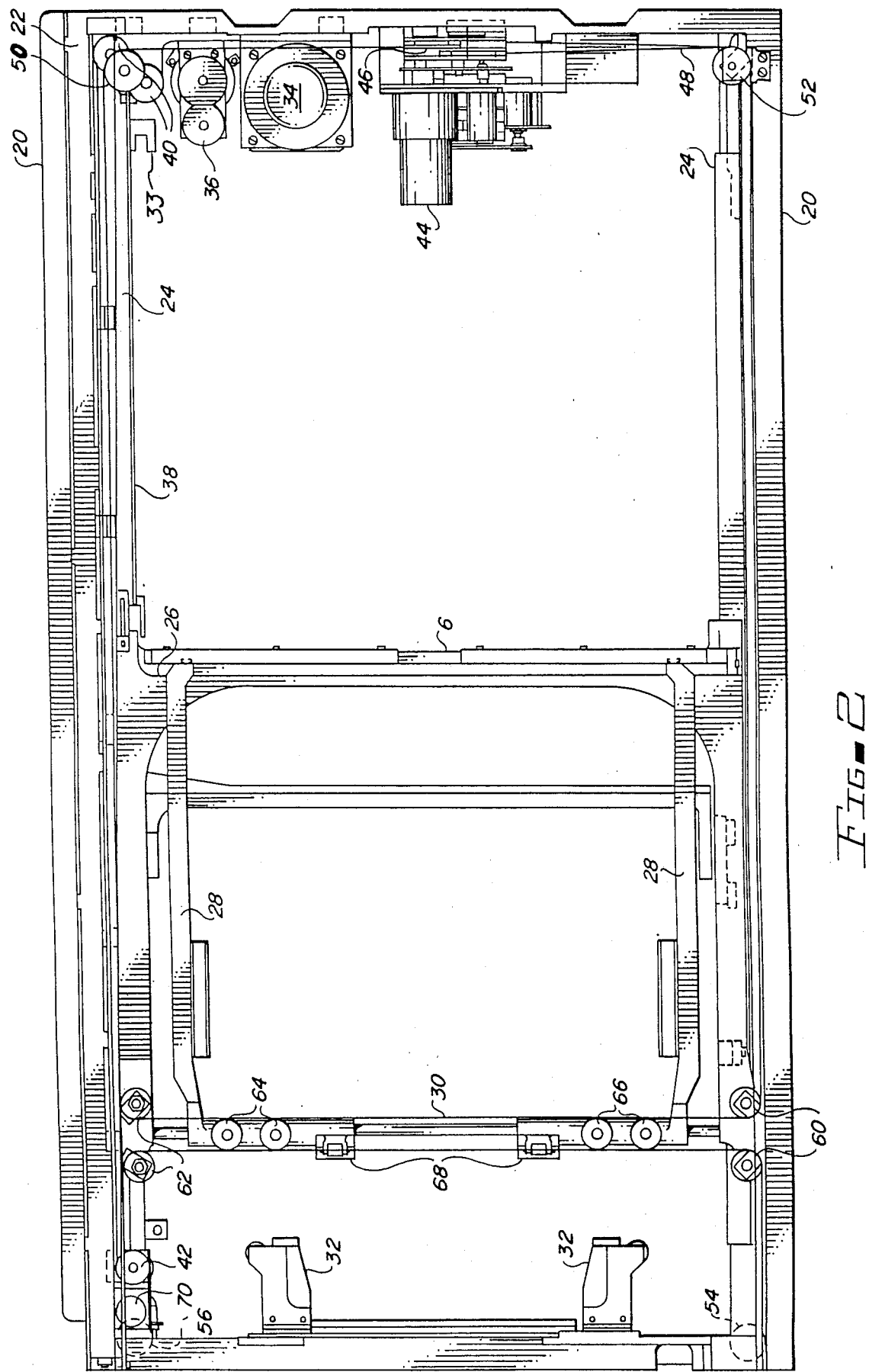
FIG. 2 is a top plan view of an x-ray film holder and drive mechanism.

Referring now to FIG. 2, there is shown a top view of the spot filming apparatus 12 with all covers removed for illustrating the film holding mechanism and the drive mechanism for actual movement of the film holding mechanism. The apparatus 12 comprises an outer frame 22 with the attached side rails 20. Within the frame 22 are additional internal rails 24 on which an x-ray film holder 26 rides. Holder 26 also includes transversely moveable, with respect to the longer dimension of apparatus 12, side elements 28. The side elements are adjustable for holding different widths of film in the film holder and can be moved in synchronism for positioning a film in various positions. In FIG. 2, the film holder 26 is shown in an intermediate position between front stops 32 and rear stop 33. In the forward position, a cross-bar 30 will contact end stops 32.

The film holder 26 is positioned by means of a motor drive mechanism including a motor 34 having a belt drive (not shown) for effecting rotation of geared pulleys 36. The pulleys 36 drive a belt 38 which is connected at each end to the film holder 26. The belt 38 passes around pulleys 40 and 42 at each end of the frame 22 of the spot film apparatus 12. The pulleys 40 are idler pulleys around which the belt 38 passes since the belt itself is driven by the pulley assembly 36 connected to the motor 34. The belt 38 is connected to each side of the film holder 26 so that the film holder 26 can be driven in either a forward or reverse direction by controlling the direction of drive of the motor 34.

The outer arms 28 which are used to close on a film cassette holder (not shown) are driven by a second motor 44 also connected through a plurality of pulleys to a continuous drive cable 48 which is connected to each of the arms 28. The cable 48 also passes over idler pulleys 50, 52, 54, 56 located at each corner of the frame 22. In addition, there are provided idler pulleys 62 and 60 at each side of the film holder 26 which allow the cable to be turned at 90° to be connected to the arms 28. Additional pulleys 64 and 66 connected to the arms 28 and fastening means 68 provide a connection from the cable to the arms 28. By controlling the operation of the motor 44, the arms 28 can be made to open or close as needed. Furthermore, it will be appreciated that the film holder 26 including the arms 28 can be driven to different positions without the arms 28 opening or closing since the cable 48 will ride on the various pulleys as long as it is maintained at a constant length.

Located at the forward end of the frame 22 is a position sensor 70. The position sensor 70 is geared to the pulley 42 such that an output signal is provided from the sensor 70 indicative of the actual position of the film holder 26. In its simplest form, the position sensor 70 may comprise a potentiometer. The potentiometer may have its ends connected to a fixed voltage source so as to provide a variable voltage output signal as the position of the film holder 26 varies or it may simply provide a variable resistance proportional to the position of the film holder 26. Another potentiometer (not shown) is operatively connected to one of the pulleys about which cable 48 passes in order to provide a similar signal representative of the position of arms 28.

The spot film apparatus thus far described is not considered to be a novel apparatus with respect to the present invention. More particularly, the spot film apparatus described above is part of a Type 88 spot film device available from General Electric Company. The objective of the spot film device is to deliver a film cassette into an x-ray beam to record an x-ray image on the film within the film cassette. It is desirable, as previously stated, to perform this function as rapidly as possible. In the prior art systems the control of the film holder 26 has involved applying a voltage to the motor 34 in which the voltage applied to the motor 34 has an amplitude proportional to the distance that the film holder 26 has to move. Velocity proportional feedback or lead network compensation is generally used for stability. Although this results in a rapid acceleration of the film holder 26 thus minimizing the time required to transition between positions, such an action sets up structural vibrations in the film cassette supporting structure. The resolution of the imaging process requires that the amplitude of any vibration of the film cassette be below a certain limit. The effect of vibration due to cassette positioning is to degrade system performance resulting in either greater access time, i.e., time between exposures, or degradation of image quality.

Before discussing applicant's novel solution to this problem, reference will now be made to FIG. 3 in which there is shown a simplified block diagram of the elements involved in controlling the operation of the motor 34 for positioning the film holder 26. The position command (POS COMM) is an operator command input to a position processor 72 or control system for the motors within the spot film device. In the illustrative embodiment, the position processor 72 includes a microprocessor for receiving the position command and for converting it to appropriate drive signals for a servo control amplifier within the position processor. The output signal developed by the position processor 72, in reality, a drive signal developed by the servo control within the position processor 72, is indicated as a position output command (POS OUTPUT) which is supplied to a comparator 74. A second input terminal of the comparator 74 is connected to receive a signal from the actual position sensor 70. The result of the comparison in comparator 74 is a speed command to motor 34. As will be appreciated, if the position command signal is passed through the position processor 72 as a large delta command, i.e., a command related only to the difference in present position versus a desired position, the error signal will initially represent a very large voltage to be applied to the motor 34. This will result in a rapid acceleration of the motor 34 causing the apparatus 26 to be rapidly accelerated towards a new positon. However, such rapid acceleration results in structural vibrations in the cantilevered spot filming apparatus 12 which must settle out before an image can be exposed.

Applicants have discovered that a solution to this problem is to provide continuous control of the positon, velocity, acceleration or other motion related attribute of the film holder 26 over its normal range of motion. Applicants have further found that the preferred method of controlling the film holder 26 is to cause the motion of the film holder 26 to describe a value as a function of time which tends to minimize the vibration of the supporting structure. The nature of the selected motion profile must be such that it generates a smooth motion of the film holder 26 but may take the form of a sine, gaussian, sine squared or similar smooth position versus time attribute. The main concern is that the motion control of the film holder 26 must exist throughout the entire transition. By controlling the motion over its entire transition distance, the force required to move the holder 26 is applied more gradually and constantly so that very little jerking of the holder 26 occurs.

Figure 5:
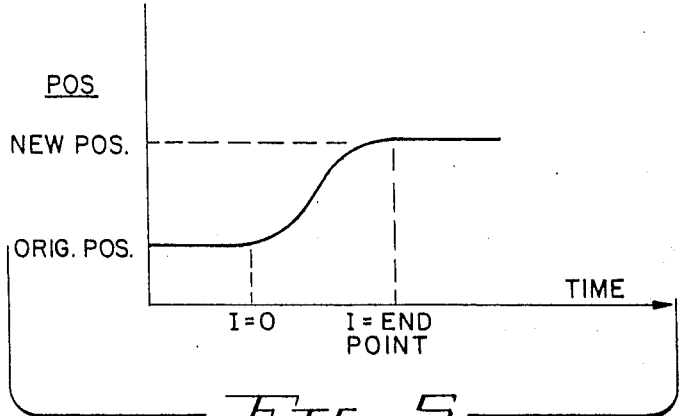
FIG. 5 is a diagram of position versus time for film holder motion using the method of FIG. 4.

Although various types of profiles can be utilized in defining the motion of the film holder 26 over its range of moves, a preferred embodiment employs a sine curve in the form of an inverted cosine curve. Referring briefly to FIG. 5, there is illustrated a graph of position versus time for a desired move between an original position and a new position. As can be seen, the shape of the curve between I=0 and I=end point, is a negative cosine curve which starts out with a slow change in position, has a rapid position change during the middle portion of the move and a final slow position change near the end point. This shape curve has been found to produce a minimum amount of vibration of the film holder assembly thus reducing the time required between exposures.

Figure 3:
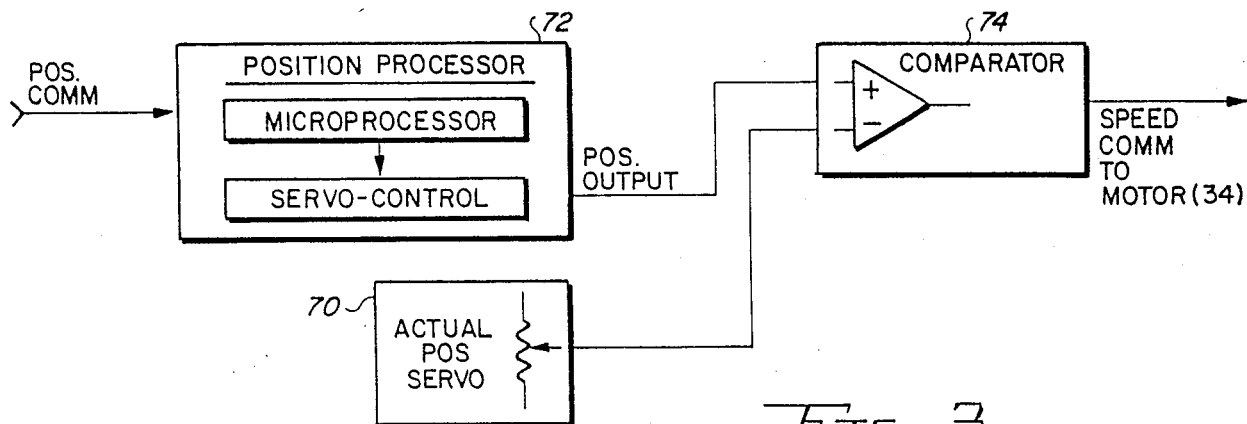
FIG. 3 is a simplified block diagram of a control system for the film holder of FIG. 2.

The implementation of the preferred method of control of the film holder 26 utilizes a microprocessor, as shown in FIG. 3, which generates a voltage versus time signal as a series of discrete voltages which represent the desired position versus time relationship. The amplitude of the position versus time relationship is determined by the length of the desired move and the shape of the move profile that is chosen to generate the smooth motion. For the illustrative embodiment, the motion profile chosen is:

$$x(t) = A/2 * (-\cos(\pi * t/T) + 1); \quad 0 \leq t \leq T$$

$$x(t) = A; \quad T < t$$

where:

x(t)=motion profile, position vs. time
A=amplitude of move, difference between existing position and final position
cos=cosine function
$\pi$=ratio of circumference to diameter of a circle
t=time, independant variable
T=the total time allowed for the move, a constant It will be appreciated from an examination of the above equation, that the motion profile implemented is that shown in FIG. 5. Although the profile could be determined by solving the above equation for each increment of motion or at each clock cycle of the microprocessor, it has been found more feasible to implement the motion profile as a unit value function which can be stored in a look-up table in a manner well known in the art. In this embodiment, the motion profile is broken down into a predetermined number of clock cycles, e.g., 500. The number of clock cycles chosen will vary with the type of system in which the invention is implemented. In this preferred embodiment, the unit move is divided into a predetermined number of clock times so that the time required to complete a move will be constant irrespective of the length of the move. For this reason, the value associated with the cosine function, i.e., the value of the cosine at any particular instant in time, can be extracted from the look-up table as the program is run in the microprocessor. The only variable in such an implementation then becomes the amplitude of the move, i.e., the distance through which the film holder 26 is to move.

Figure 4:
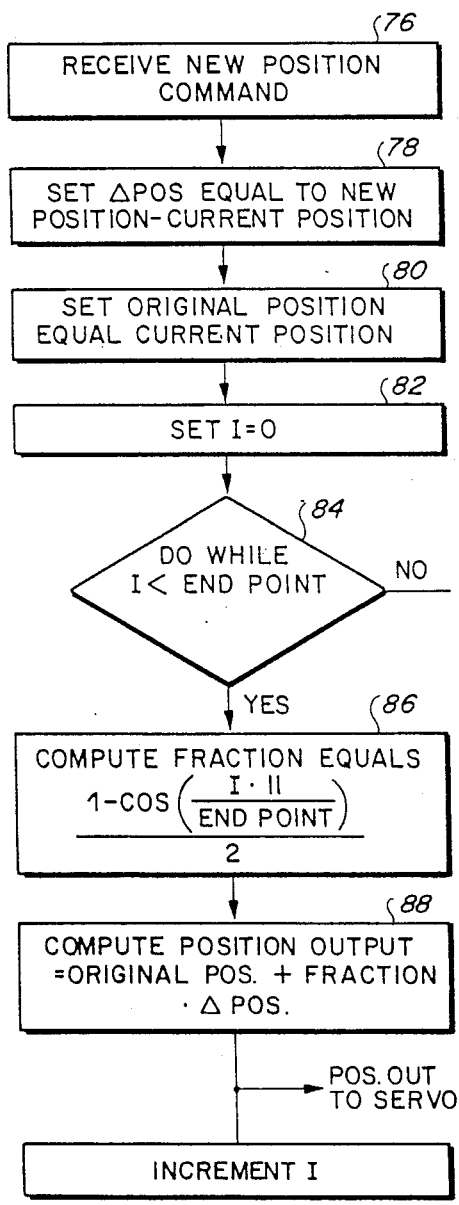
FIG. 4 is a flow chart for implementing a control method in accordance with the present invention.

For a better understanding of the present invention, reference may now be made to FIG. 4 in which there is shown a flow chart for implementing the inventive method in a microprocessor or other computer in a position processor. When the new position command is received by the position processor 72, the processor first sets the delta position equal to the new commanded position minus the current position of the film holder 26. Delta position then becomes the amplitude of the move, i.e., "A" as shown in the equation of motion described above. The original position of the film holder 26 is then equated to the current position so that each subsequent calculation will result in a different delta position. More particularly, the delta position or move amplitude will vary as the film holder 26 moves from its position at which the position command was first received to the desired position.

Since the implementation in the preferred embodiment is by use of a look-up table in which the actual profile for a unit value is stored, the look-up table address pointer must be set at the beginning of the look-up table when the move is first initiated. Accordingly, block 82 is indicative of setting the pointer to the beginning of the look-up table, i.e., setting "I" equal to 0 where "I" equals the particular pointer position in the look-up table. Block 84 is a decision block and actually forms a loop in a manner well known in the art. In computer language, the block 84 is a "do while" block which causes the program to continue to run each sequential operation so long as the pointer position is less than the end point, i.e., "I" less than end point. For illustrative purposes, the end point has been set at a value of "I" equal to 500, that is, a time of 500 clock cycles in order to process the entire unit value profile. Thus, any move will be broken into 500 equal time increments. So long as "I" is less than 500, the program will step into the computational mode in which a value of the amplitude of the inverted cosine function can be computed at each time increment. As mentioned previously, in the look-up table format, each value has already been computed and the pointer merely allows that value to be pulled out of the look-up table. Block 86 is indicative of computing the fraction representing the value of the cosine function as shown in FIG. 5 for each increment of time. Once the fractional value has been determined from block 86, the position output signal can be computed as the sum of the original position plus the fractional change times delta position, wherein the delta position represents the remaining distance to move between the current position and the new or desired position. This computed value is then outputted as a position output to the comparator 74. The final step in the program is to increment the value of "I" so that the program can then step to the next computed fractional value on the cosine function.

Since this program is processed once for each clock cycle, the delta position will continue to be changed as the motor drives the film holder 26 to each new position. The position sensor 70 will provide a continuous output representative of the actual position of the film holder 26 which position output will then be compared to each new position output command from the position processor 72. The profile motion of the film holder 26 will thus follow the position versus time graph shown in FIG. 5.

Although the invention has been described with reference to a particular embodiment, it will be appreciated that other types of motion profiles may be implemented using the teachings of the present invention. Furthermore, although the illustrative embodiment has been disclosed with reference to control of the position of film holder 26, it will be appreciated that the control method may be applied to any electric motor in the system whose continuous control is necessary in order to minimize vibration. For example, in the disclosed system, the motor 44 is also controlled by apparatus similar to that used for controlling motor 34 so that longitudinal motion of a film cassette held by arms 28 is also without jitter. Furthermore, although not shown, most commercially available spot film apparatus include rectangular masks of lead or other x-ray absorbtive material that are moved to define a particular area of film for exposure. Such masks are motor driven in the same manner as the cassette holder and the present invention may be employed to reduce vibration induced by mask motion. Still further, such commercial apparatus also incorporate a palpitator cone which is power driven and may also induce vibrations which can be minimized by use of the present invention. It is intended therefore that the invention not be limited to the particular embodiment but that it be interpreted in light of the spirit and scope of the appended claims.

We claim:

1. A method for controlling motion of power driven apparatus in a medical x-ray spot filming system in order to minimize induced vibration of an x-ray film from acceleration and deceleration of the apparatus, the method comprising the steps of:
   establishing a desired profile of position of the apparatus as a function of time;
   dividing the profile into a plurality of equal time increments;
   computing sequentially a change in position for each of the time increments; and
   moving the apparatus in accordance with the computed position change for each time increment.

2. In an x-ray imaging system of the type including an electric motor driven spot filming apparatus for positioning an x-ray film with respect to a target, a method of controlling such positioning to minimize vibration comprising the steps of:
   receiving a position command representative of a desired position of the apparatus;
   computing the distance to move between a present position and the desired position;
   dividing the distance to move into a predetermined number of incremental moves; and
   providing a control signal representative of each of the incremental moves for causing a motor to position the apparatus in a continuous sequence of incremental moves.

3. In an x-ray imaging system of the type including an electric motor for driving an x-ray film holder from a present position to a desired position, the motor being connected in a servo-control system including a controllable power source for supplying electrical power to the motor, a method of controlling power to the motor for effecting relatively smooth motion of the film holder comprising the steps of:
   determining the distance between the present position of the film holder and the desired position;
   establishing a fixed time for moving the film holder from the present position to the desired position;
   dividing the fixed time into a predetermined number of equal time increments;
   computing an incremental distance change for each time increment in accordance with a predetermined position versus time profile over the distance between the present position and the desired position;
   summing each successive incremental distance with the last determined present position for generating an intermediate desired position;
   converting the intermediate desired position to a position command signal; and
   supplying the position command signal to the servo-control system to effect movement of the film holder.

4. In an x-ray apparatus of the type including an electric motor driven x-ray film holder for electrically positioning an x-ray film in a predetermined position with respect to a patient and an x-ray source, the motor being controlled by a servo-control system in response to a position command signal, the servo-control system including position sensing means for providing a signal representative of a current position of the film holder, apparatus for providing controlled motion of the film holder comprising:
   means for computing the distance to be moved between a new position identified by the position command signal and the current position of the film holder;
   means for storing a unit representation of a predetermination position versus time move profile;
   means for dividing said unit representation into a plurality of equal time segments;
   means for sequentially determining the amplitude of said unit representation at each time segment;
   means for multiplying said amplitude at each time segment by the remaining distance to be moved for obtaining a position change signal;
   means for summing a signal representative of the current position of the film holder to the position change signal for obtaining a position output signal; and
   means for comparing said position output signal to a current position signal for developing an error signal for causing operation of the motor.

5. In an x-ray apparatus of the type including an electric motor driven x-ray film holder for electrically positioning an x-ray film in a predetermined position with respect to a patient and an x-ray source, the motor being controlled by a servo-control system in response to a position command signal, the servo-control system including position sensing means for providing a signal representative of a current position of the film holder, a method for providing controlled motion of the film holder comprising the steps of:

computing the distance to be moved between a new position identified by the position command signal and the current position of the film holder;

storing a unit representation of a predetermination position versus time move profile;

dividing said unit representation into a plurality of equal time segments;

sequentially determining the amplitude of said unit representation at each time segment;

multiplying said amplitude at each time segment by the remaining distance to be moved for obtaining a position change signal;

summing a signal representative of the current position of the film holder to the position change signal for obtaining a position output signal; and comparing said position output signal to a current position signal for developing an error signal for causing operation of the motor.

6. The method of claim 5 wherein said predetermined profile comprises an inverted cosine curve computed between 0 and 180 degrees.

7. The method of claim 5 wherein said unit representation is divided into a predetermined number of equal time segments irrespective of the distance to be moved.

8. The method of claim 7 wherein each unit representation segment amplitude is stored in a look-up table.

9. The method of claim 5 wherein said unit representation is of the form $$x(t) = \tfrac{1}{2}\left(1 - \cos\frac{\pi t}{T}\right)$$

where T is a time for completing a move.

* * * * *